United States Patent [19]
Gamez Anguiano

[11] Patent Number: 5,125,938
[45] Date of Patent: Jun. 30, 1992

[54] EXHAUST PIPES OF VEHICLES

[76] Inventor: Eugenio Gamez Anguiano, Avda. Villa de Cuba. 59, Sevilla, Spain

[21] Appl. No.: 579,701

[22] Filed: Sep. 10, 1990

[30] Foreign Application Priority Data

Jun. 28, 1990 [ES] Spain .................................. 9001783

[51] Int. Cl.⁵ .............................................. B01D 46/00
[52] U.S. Cl. ................................. 55/276; 55/DIG. 30; 55/321
[58] Field of Search .......... 55/DIG. 30, 276, 318–321

[56] References Cited

U.S. PATENT DOCUMENTS 1,148,508  8/1915  Gagnon ..................... 55/DIG. 30
1,867,325  7/1932  Neville ...................... 55/DIG. 30

Primary Examiner—Bernard Nozick
Attorney, Agent, or Firm—Fleit, Jacobson, Cohn, Price, Holman & Stern

[57] ABSTRACT

A muffler for a vehicle exhaust has anterior, intermediate and posterior sections. An array of parallel lateral plates are located in the upper part of the anterior section. Exhaust gas is introduced to the anterior section above the plates from an inlet duct opening into a header above the plates. A gas recirculation duct leads from the header back into the inlet duct to promote turbulent flow of gas through the plates. The posterior section of the muffler has a pair of filters through which the exhaust gas passes and an inflow duct leading into one of the filters into which air under pressure is introduced to mix with the exhaust gas.

5 Claims, 2 Drawing Sheets

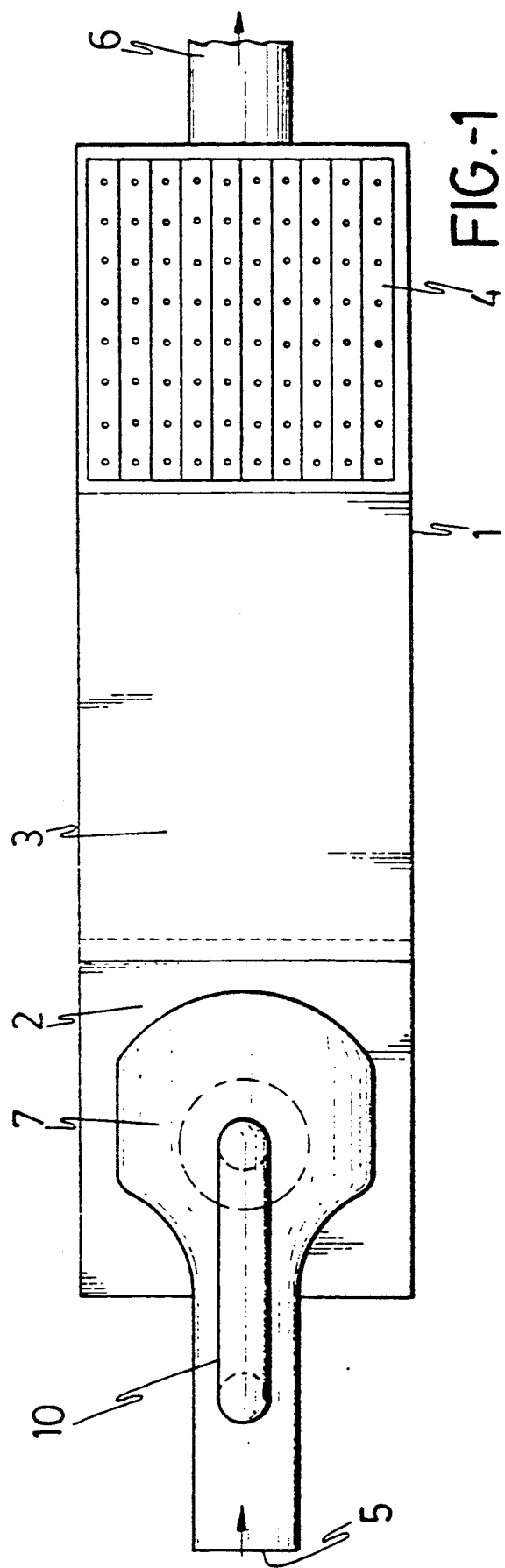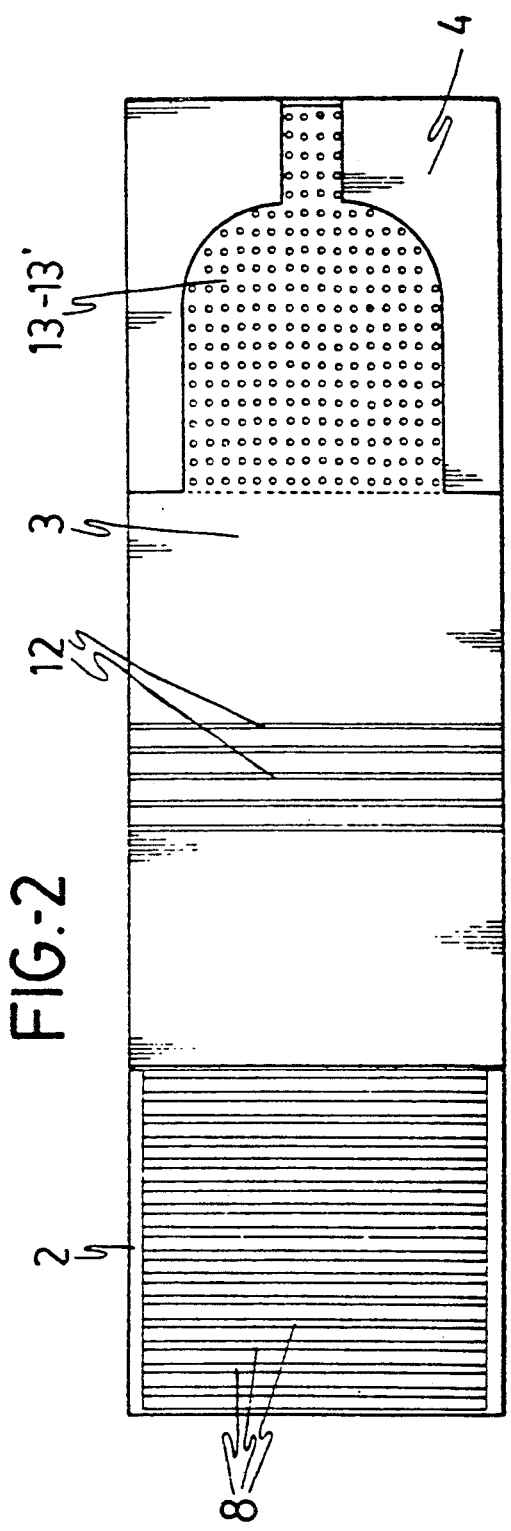

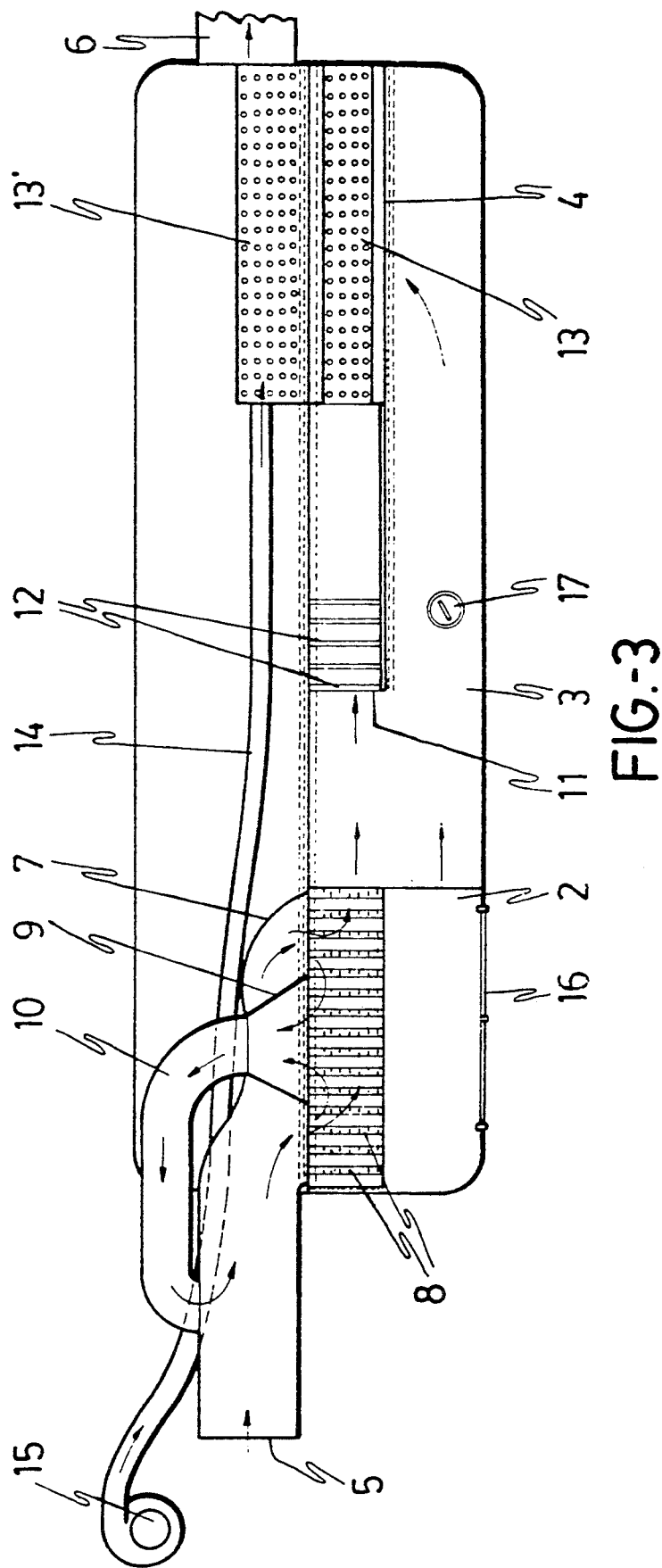

EXHAUST PIPES OF VEHICLES

DESCRIPTION

Purpose of the Invention

The invention concerns exhaust pipes of vehicles with internal combustion engines. The proposed muffler, when incorporated into the exhaust pipe, eliminates particles of pollution contained in the gases produced during the process of combustion.

The muffler, which will be improved by the invention presented here, has been especially conceived to eliminate all kinds of pollution arising from internal combustion. It fulfills the function of the traditional catalytic converter, which is presently integrated into the exhaust pipes of many motorised vehicles.

Background

Pollution caused by combustion engines, including gases like carbon dioxide, sulphur and others, constitutes an increasing danger for human health and the environment. In addition, the number of vehicles in circulation as well as other kinds of combustion motors is increasing daily. Pollution is a grave problem which recently has attracted a great deal od scientific interest.

One method which has been developed is the installation of catalytic converters into the exhaust pipe with the purpose od decontaminating the gases produced by combustion.

These catalytic converters, however, create problems of efficiency and structure. In addition, they are complicated devices, implicating very high costs, and tend to have a short useful life-span.

To avoid a fast deterioration of the catalytic converter, the exhaust system has to be rebuilt, and the motor re-adjusted very precisely. This explains why auto-manufacturers seek constantly to delay the installation of catalytic converters in their vehicles. As a consequence of this reluctance, pollution continues to increase.

DESCRIPTION OF THE INVENTION

The improvements presented here aim to provide a satisfactory solution to the above mentioned problems in a simple and efficient way. The improvements are based on a new type of muffler, whose construction and installation are very simple, but which nonetheless permits a very high degree of decontamination of the gases produced by internal combustion. Its performance is as high or even higher that that of the conventional catalytic converter, while its cost is considerably lower. Its longevity is comparable to that of conventional ehaust pipes.

More concretely, the muffler consists of a box or hollow element having any geometrical shape and an intake for gases coming from the motor and an exit for those already decontaminated. Between the intake and the exit, the box or hollow element forms a big extension i.e., a header. In this extension there is a funnel which leads backwards, communicating again with the intake and creating a kind of recycling of gases. Under this funnel and the extension thereof, there is a series of parallel plates with any geometrical shape, but all with the same distance one to another. They form a short rectangular contour. The wind-effect produced by the funnel creates a turbulence which makes a first decontamination of the gases, as most of the polluting elements get trapped between them. Then gases have to pass through a further series of filters located behind the entrance of a second chamber. By the means of these last filters, the absolute decontamination of the gases takes place. This process of decontamination is aided by atmospheric air injected by an electric ventilator.

The case housing the device is provided with several tapped openings. One of these is in the anterior section, near the parallel plates. There is a further series of openings in the intermediate section. These openings allow a periodic cleaning of the entire device, either by high-pressure air or by the injection of a mixture of air and water, etc., thereby extending the useful life of the device.

DESCRIPTION OF THE DRAWINGS

The attached drawings will permit a better understanding of the invention.

FIG. 1: It is a schema of the upper surface of the muffler case.

FIG. 2: It represents a top-view of the interior of the device, omitting the entrances, the exit and the top of the device. It represents the compartment housing the parallel plates, the intermediate section leading towards the filters, and the posterior section of filters.

FIG. 3: It is a cross-section (looking downwards) of the inner part, showing the entire length of the device.

PROPOSED REALISATION OF THE INVENTION

As the described drawings show, the invention is a kind of muffler which can be installed into the exhaust pipes of vehicles with internal combustion. The muffler consists of a box or hollow element within which we distinguish clearly three different areas: the anterior, the intermediate and the posterior. The characteristics of the hollow element or box (1) are the intake of gases coming from the motor and the exit of the decontaminated gases. The gases' intake forms a big extension i.e., a header, in the interior of the case (7). Under this extension there are parallel plates with any geometrical shape but all with the same distance one to another. The distance should be between three and five mm. These parallel plates will largely occupy the anterior rectangular section. Their height should be less than half of the space between the mentioned extension at the intake and the bottom of the box or hollow element (1).

In the center of the extension there is a funnel. From there a conduction leads backwards, communicating again with the intake, or to be more precise, leading to a point slightly behind the mentioned intake. In FIG. 3 one will find a clear illustration.

The gases coming from the motor, pass the entrance (5) and reach the parallel plates (9). The wind-effect produced by the funnel (9) creates a turbulence in this section. This makes the gases stay a considerable time in contact with the plates. As a consequence the polluting elements as for example carbon dioxide and sulphur get trapped between these parallel plates. The gases follow their way towards the intermediate section (3), as the arrows indicate. An entrance (11) with prefilter (12) is located there. The mentioned entrance with prefilter leads the gases, already mostly decontaminated towards the posterior section (4) which contains filters (13 and 13') of different characteristics. The gases pass these filters. By this arrangement and the injection of pressurised air through a conduct or channel (14) a turbulence is caused. This turbulence helps to achieve a cleaning of the gases so that they leave the exit (6) absolutely clean.

The injection of pressurised air through a channel (14) towards the filters (13-13') will be realised by an electrical ventilator installed and fixed at an appropriate place in the vehicle.

The housing (1) will be provided with some plugs on the bottom side (16 and 17). Taking them off will allow a periodical cleaning of the whole case and above all of the parts with the parallel plates (8) as well as the prefilters and the filters themselves (13-13'). In this cleaning process there will be used water or pressurised air or a mixture of both.

As any expert in this field will clearly follow, it is considered unnecessary to enter into further detail in this description to bring to evidence the consequences of this invention and its derived advantages.

Variations in materials used, form, dimensions and the disposition of the different components are possible under the condition that this does not entail alterations in the essential improvements of the invention.

The terms which have been used in the presentation of this document always have to be taken in their wide sense, not in a restrictive sense.

I claim:

1. A muffler for a vehicle exhaust system comprising a casing defining an interior chamber having intercommunicating anterior, intermediate and posterior sections, the anterior section having an upper part and a lower part, an array a parallel lateral plates in the upper part of the anterior section, an exhaust gas inlet duct leading into a header covering said plates, a gas recirculation duct extending from said header back into said inlet duct for providing recirculation of part of the exhaust gas and turbulent flow of exhaust gas through said plates and hence into the intermediate and posterior sections, filter means for the gas to pass through in the posterior section and a gas outlet from the posterior section 2. A muffler as claimed in claim 1 including plugs in the casing for obtaining access to and cleaning out the interior chamber.

3. A muffler as claimed in claim 1 including an inflow duct and ventilator means for introducing a current of air under pressure to flow through the filter means with the exhaust gas.

4. A muffler as claimed in claim 3 wherein the filter means comprises a first lower filter for receiving gas from the intermediate section, and a second upper filter communicating with the gas outlet.

5. A muffler as claimed in claim 4 wherein the air inflow duct leads into the second filter.

* * * * *